US006779104B2

(12) United States Patent
Sheaffer (10) Patent No.: US 6,779,104 B2
(45) Date of Patent: *Aug. 17, 2004

(54) METHOD AND APPARATUS FOR PRE-PROCESSING INSTRUCTIONS FOR A PROCESSOR

(75) Inventor: Gad S. Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/376,767

(22) Filed: Feb. 28, 2003

(65) Prior Publication Data

US 2003/0135714 A1 Jul. 17, 2003

Related U.S. Application Data

(62) Division of application No. 09/220,159, filed on Dec. 23, 1998, now Pat. No. 6,539,471.

(51) Int. Cl.[7] .............................................. G06F 9/00
(52) U.S. Cl. ........................ 712/217; 712/23; 712/24
(58) Field of Search ............................ 712/217, 23, 24, 712/216, 218

(56) References Cited

U.S. PATENT DOCUMENTS

| 5,493,669 | A | 2/1996 | Denman, Jr. ................ 395/460 |
| 5,535,346 | A | 7/1996 | Thomas, Jr. ................. 395/375 |
| 5,946,496 | A | 8/1999 | Sugumar et al. ........ 395/800.02 |
| 5,970,235 | A | 10/1999 | Witt et al. ................... 395/389 |
| 6,081,884 | A | 6/2000 | Miller ......................... 712/204 |
| 6,112,019 | A | 8/2000 | Chamdani et al. .......... 395/390 |
| 6,170,051 | B1 | 1/2001 | Dowling ...................... 712/225 |
| 6,192,465 | B1 | 2/2001 | Roberts ....................... 712/212 |
| 6,199,152 | B1 | 3/2001 | Kelly et al. .................. 711/207 |
| 6,324,640 | B1 | 11/2001 | Le et al. ...................... 712/217 |

OTHER PUBLICATIONS

Kenneth C. Yeager, 1996, IEEE Micro; pp. 28–40.*

* cited by examiner

Primary Examiner—Gautam R. Patel
(74) Attorney, Agent, or Firm—Schwegman, Lundberg, Woessner & Kluth, P.A.

(57) ABSTRACT

Method and apparatus for reducing or eliminating retirement logic in an out-of-order processor are disclosed. Instructions are processed using a processing unit capable of out-of-order processing and having architectural registers having an architectural state. Groups of instructions are prepared for processing by processing unit, wherein within each group to be processed the instructions producing the final state of an architectural register are changed so that they write to an output copy of the architectural state, the instructions reading architectural registers are changed to read from an input copy of the architectural state, and the instructions within each group producing results to architectural registers that would be overwritten by another instruction in the group are changed to write their results to temporary registers. The input copy of the architectural registers is obtained prior to processing of the at least one group, and the output copy is written to the architectural registers following completion of processing of the at least one group. Interim results in the group are stored in temporary registers. In another embodiment, instructions are associated with a retirement stop indication which indicates whether an instruction can be retired with instructions preceding it without regard to order.

9 Claims, 8 Drawing Sheets

METHOD AND APPARATUS FOR PRE-PROCESSING INSTRUCTIONS FOR A PROCESSOR

This application is a divisional and claims priority to U.S. patent application Ser. No. 09/220,159, filed Dec. 23, 1998 now U.S. Pat. No. 6,539,471 and assigned to the same assignee of the present application, which is incorporated herein by reference.

TECHNICAL FIELD

The present invention relates to the field of electronic data processing devices. More particularly, the present invention relates to the operation of a data processor.

BACKGROUND

A computer program is composed of a series of ordered instructions that, when executed in a known sequence, bring about a desired result. While in some cases instructions are executed in the order they are arranged in the computer program, in other cases instructions can be executed out-of-order without altering the end result. This characteristic is used by state-of-art computer processors. Such processors employ out-of-order (OOO) processing which allows, in certain cases, for instructions to be executed out-of-order, resulting in greater throughput and better utilization of processing resources.

An OOO processing architecture allows instructions to execute out-of-order or simultaneously, for example, where a later occurring instruction does not substantially employ input data produced from an earlier occurring instruction. However, while instructions may be executed out-of-order if this constraint is met, it remains desirable in many cases that the data produced by instructions executed out-of order be output, or retired, in a manner that preserves the order of the original instructions. This is true, for example, where the instructions executed out-of-order produce output to the same architectural registers. If a program's proper execution depends on an architectural register to be updated in a certain order in response to executing instructions, it is desirable that the order be preserved whether or not the instructions are to be executed in order. Therefore, processors that implement OOO processing architectures also employ retirement logic that assures that the executed instructions are committed to the architectural registers in the proper order. In one example OOO architecture with retirement logic, a re-order buffer (ROB) holds instructions to be executed by the processor. A reservation station supplies the processor instructions from the ROB, out-of-order in certain cases. The processor executes the instruction, and outputs the result from the executed instruction to the ROB. The ROB in turn retires the executed instructions, in order if required, by committing the result(s) to the architectural registers. Retirement logic, however, introduces delay in processing instructions, and consumes real estate on a processor's semiconductor(s) substrate. Therefore, there is potential value in eliminating the need for retirement logic, or simplifying its operation.

SUMMARY

The present invention provides method and apparatus for reducing or eliminating retirement logic in a processing system. In one embodiment, instructions are grouped for processing so that retirement logic is negligible or not employed. In another embodiment, instructions include retirement stop indications which assist in determining if instructions can be retired without regard to order.

DETAILED DESCRIPTION

In the following detailed description of the embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of actions leading to a desired result. The actions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
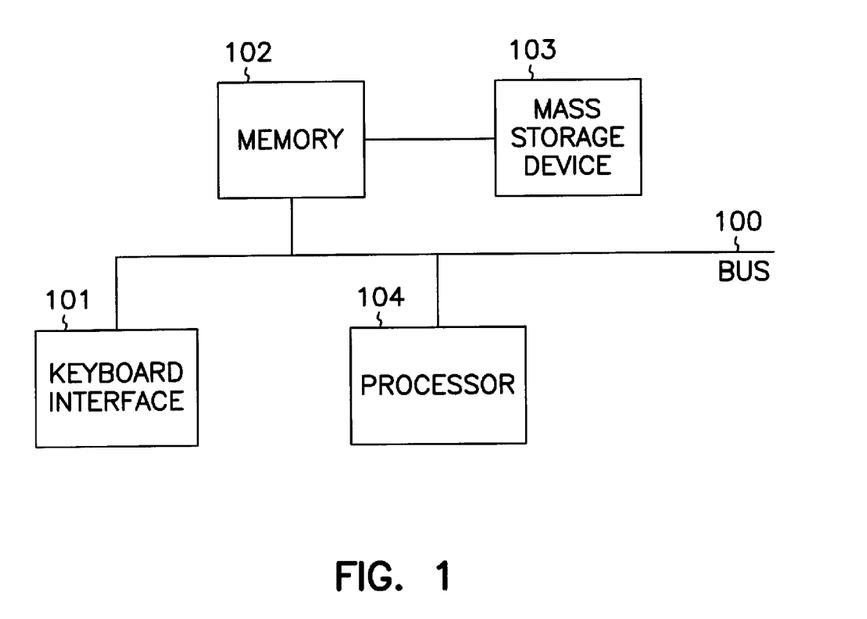
FIG. 1 illustrates in block diagram form an example embodiment of a system according the present invention.

Referring now to FIG. 1, there is illustrated in block diagram form a system of one embodiment of the present invention. The system comprises bus 100, keyboard interface 101, external memory 102, mass storage device 103 and processor 104. Bus 100 can be a single bus or a combination of multiple buses. Bus 100 provides communication links between components in the system. Keyboard controller 101 may be a dedicated device or may reside in another device, such as a bus controller or other controller. Keyboard controller 101 allows coupling of a keyboard to the system and transmits signals from a keyboard to the system. External memory 102 may comprise a dynamic random access memory (DRAM) device, a static random access memory (SRAM) device, or other memory devices. External memory 102 stores information from mass storage device 103 and processor 104 for use by processor 104. Mass storage device 103 may comprise a hard drive, a floppy disk drive, a CD-ROM device, or a flash memory device. Mass storage device 104 provides information to external memory 102. Processor 104 may be a microprocessor and is capable of decoding and executing a computer program such as an application program or operating system with instructions from multiple instruction sets.

Figure 2:
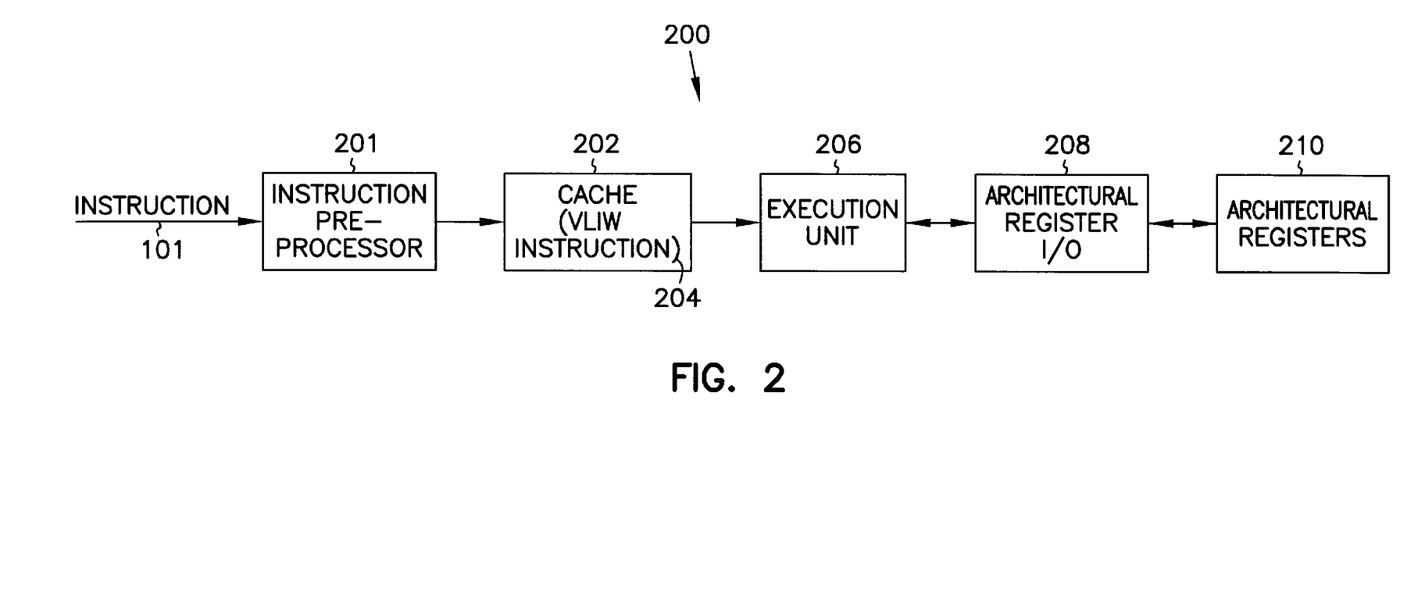
FIGS. 2, 3, 4 and 5 illustrate a first example embodiment of the invention.

Referring now to FIG. 2, there is illustrated one example embodiment 200 of a processor 104 according to the invention. In this example embodiment, an instruction pre-processor 201 receives processor instructions 101 from system memory 102 or other storage device. Instructions 101 may be, for example, microcode instructions compatible with an X86 processor available from the Intel Corporation, although the invention is not limited in scope in this respect. The instruction pre-processor in this embodiment produces very long instruction word (VLIW) instructions 204, in which instructions 101 are re-arranged if possible to improve speed of execution. Instructions 101 are stored as vectors in a VLIW instruction 204. The VLIW instructions are stored in instruction cache 202, which supplies the instructions 204 to execution unit 206, which includes an OOO processing architecture. Execution unit 206 in turn inputs and outputs copies of the architectural state of the processor to an architectural register input/output (I/O) circuit 208, which in turn is coupled to the architectural registers of the processor 104.

Figure 3:
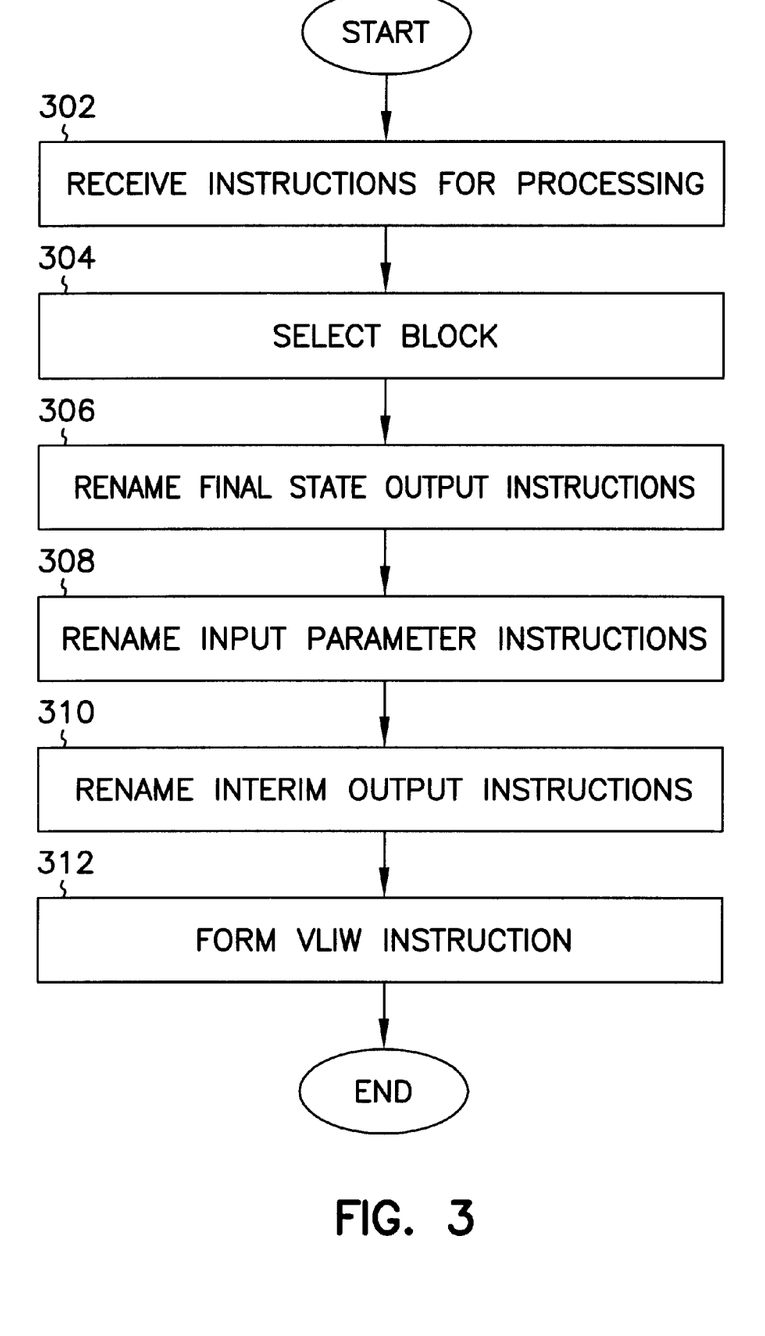

Referring now to FIG. 3, the operation of the processor of FIG. 2 to form VLIW instructions 204 will be explained. Instructions retrieved from system memory 102 or another storage device are supplied to pre-processor 201 (302). A block of instructions are selected by pre-processor 201, wherein instructions in the block form all or part of a predicted execution path (304). The block may be, for example, a block larger than a basic block. This example embodiment is most applicable to dynamic basic blocks that can have branches inside them (as long as they are predicted/resolved not to change direction from some assumed one). It is noted that a dynamic basic block may contain taken branches, along with the instructions at the target of these branches. All the instructions 101 within the block producing the last state or output signals for each architectural register ("final state outputs") are renamed to write to an output copy of processor 104's architectural state (306). All of the instructions within the block reading architectural registers produced outside of the block (termed "input parameters") are renamed to read the registers from an input copy of the architectural state (308). And, all of the output signals to architectural registers produced by instructions 101 inside the block and overwritten before its end ("interim outputs") are renamed to temporary registers (310). The instructions 101 in the block are then used to form a group of VLIW instruction 204 (312), which are stored in the cache 202 for processing by execution unit 206. By this process, the cache 202 can be filled with VLIW instructions 204 for processing.

Figure 4:
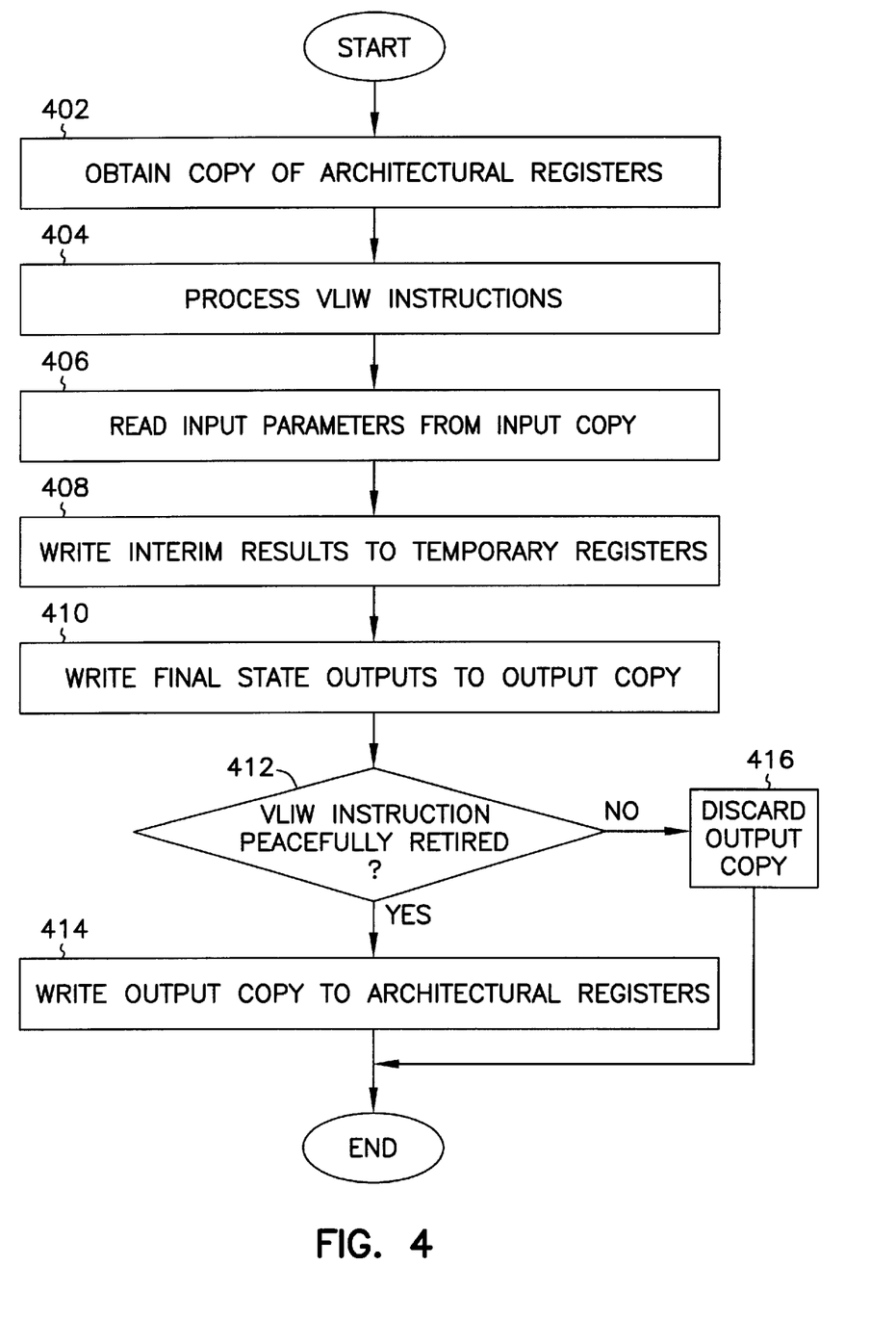

Referring now to FIG. 4, there is illustrated a flow diagram setting forth the processing of VLIW instructions 204. Each group of VLIW instructions 204 contains a block of instructions 101 to be processed. In operation, execution unit 206 processes each individual VLIW instruction in the sequence retrieved from the cache. At the start of the processing of the group of VLIW instructions 204, a copy of the architectural registers is obtained through I/O circuit 208 (402), and serves as an input copy of the architectural registers for the processing of this group. Instructions 101 within the block carried by the group of VLIW instructions 204 are then processed by execution unit 206 using an OOO processing architecture, allowing instructions 101 carried in the vectors of VLIW instruction 204 to be processed out-of-order as is possible (404). During this processing of the group of VLIW instructions, renamed instructions read input parameters from the input copy of the architectural registers (as opposed to the registers themselves) (406). Interim output signals within the block are stored in temporary registers (408). Final state output signals are written to the output copy of the architectural registers (as opposed to the architectural registers themselves) (410). Thus, upon completion of the processing of the group of VLIW instructions 204, there is produced an output copy of the architectural registers that is written to the architectural registers 210. This output copy can in turn be used to update the architectural registers 210, and serve as the input copy for the next group of VLIW instructions 204, and processing can continue (414). In the event that an exception or any other event prevents the peaceful retirement of any instruction in the block (412), the output copy of the architectural state is discarded (416), and the architectural registers remain unchanged and continue to serve as the processor's visible architectural state. As noted above, in the context of this example embodiment, the block of instructions selected (302) would typically be a dynamic basic block. Thus, one possible reason for the output architectural state not being written is that a branch in the middle of the block that was assumed not to take the control flow out of the block (via branch prediction), goes the other way, and thus all the instructions in the block cannot be retired as a whole.

Figure 5:
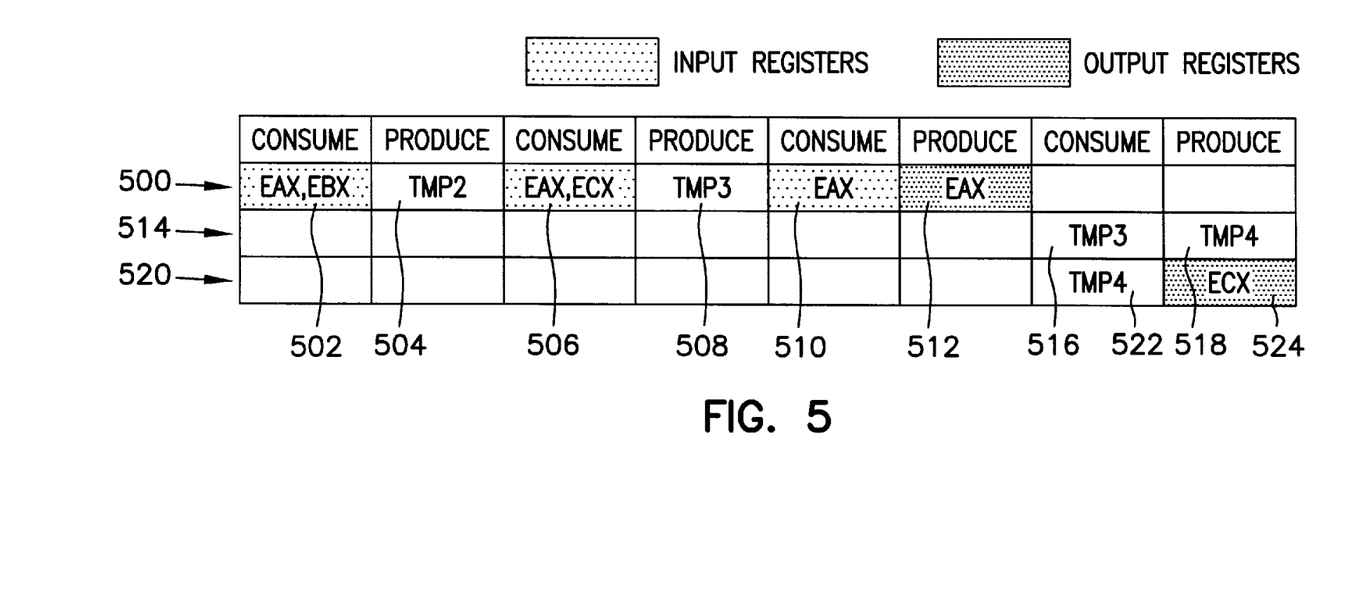

Referring now to FIG. 5, there is illustrated a simplified diagram of an example embodiment of the processing of instructions of a block carried by a group of VLIW instructions 204 in accordance with the present invention. As illustrated, all of the instructions on the first row 500 may be processed in any order, as none of the input parameters for these instructions is dependent on the output signals for the other instructions. A first instruction consumes (502) input parameters obtained from registers EAX and EBX read from the input copy of the architectural registers. The result (504) produced is stored in the temporary register TMP2, instead of an architectural register as was originally called for by instruction 502. A second instruction consumes (506) the input parameters stored in EAX and ECX of the input copy, and produces the result (508) stored in the temporary register TMP3, instead of an architectural register. Another instruction again consumes (510) the input parameter of register EAX in the input copy, and produces a result (512), which in this case is stored to the EAX register of the output copy of the architectural registers, since it is the final state output for this register. The operation shown in row 514 employs the result stored in the TMP3 register (516), and thus waits for the completion of the instruction producing this output signal. It in turn outputs to the temporary register TMP4 (518). The operation in row 520 in turn consumes the TMP4 parameter (522) and produces the final state output signal (524), which is written to the output copy of the architectural state.

The above-described embodiment thus eliminates retirement logic. Because only a single instruction in the block modifies any given architectural register, the writes to the output copy are ordered. Furthermore, in one example embodiment, the retirement rate is only restricted by the number of write ports on the architectural register file, and that can be accommodated when the instructions 101 are processed into VLIW instructions 204. Although this embodiment is illustrated with respect to the use of groups of VLIW instructions 204 to process blocks of instructions 101, the invention is not so limited, and any mechanism for marking a group of instructions for processing as a block will suffice. For example, blocks of instructions could be marked by one or more framing bits that signal the beginning and end of a block to the execution unit 206. Furthermore, this invention is in no way limited to any particular type of processing unit. For example, it can also be used to control retirement of instructions in connection with processors that restrict the update of architectural registers based on port availability, but not on the order of retirement.

Figure 6:
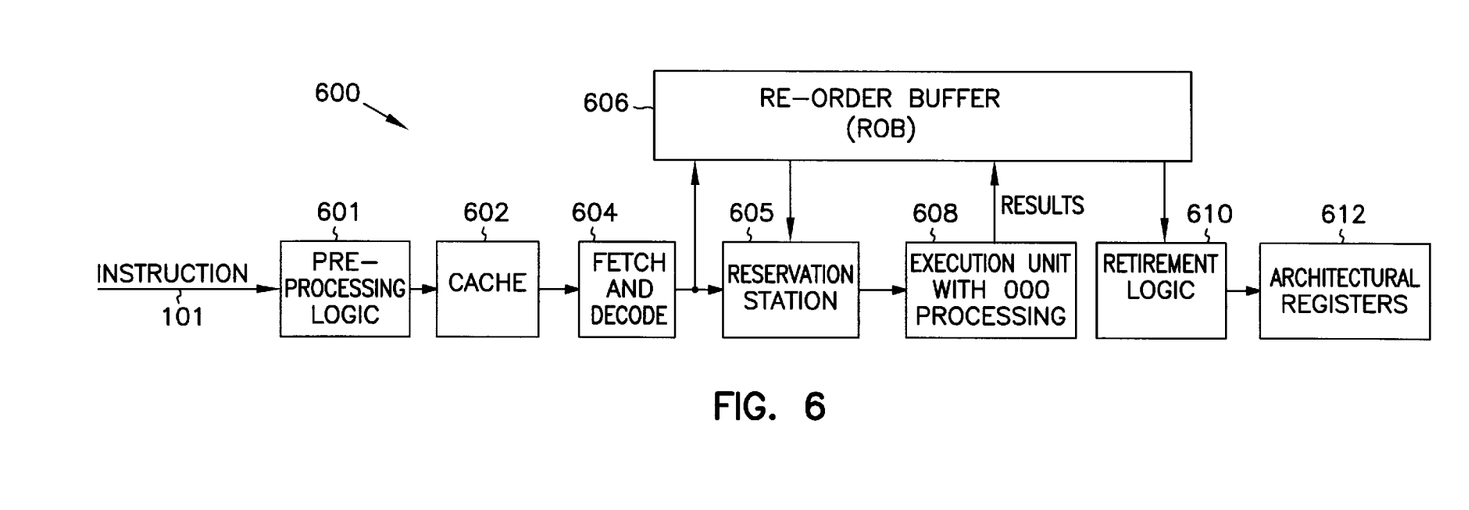
FIGS. 6, 7 and 8 illustrate another example embodiment of the invention.

Referring now to FIG. 6 there is illustrated yet another embodiment 600 of the invention. In this embodiment, a pipeline architecture is utilized to process instructions. This embodiment includes a cache 602, a fetch and decode stage(s) 604, a reservation station 605, a re-order buffer (ROB) 606, an execution unit 608 with an OOO processing architecture, simplified retirement logic 610, and architectural registers 612. Embodiment 600 further includes an instruction pre-processing logic 601. Generally, in operation, instructions are supplied to cache 602 from pre-processing logic 601, and in turn processed by the pipeline formed by the components 604, 605, 606, 608 and 610, with the results ultimately stored in architectural registers 612. In this regard, instructions are fetched and decoded by circuit 604, and decoded instructions prepared for execution are supplied to the ROB 606. Execution unit 608 obtains instructions from ROB 606, under control of reservation station 605, executes them, at least in part out-of-order, and returns results to the ROB 606, for retirement. ROB 606 retains a correlation between the results and the instructions in the ROB from which they were produced. Furthermore ROB 606 maintains an indication of the original order of the instructions.

Figure 7:
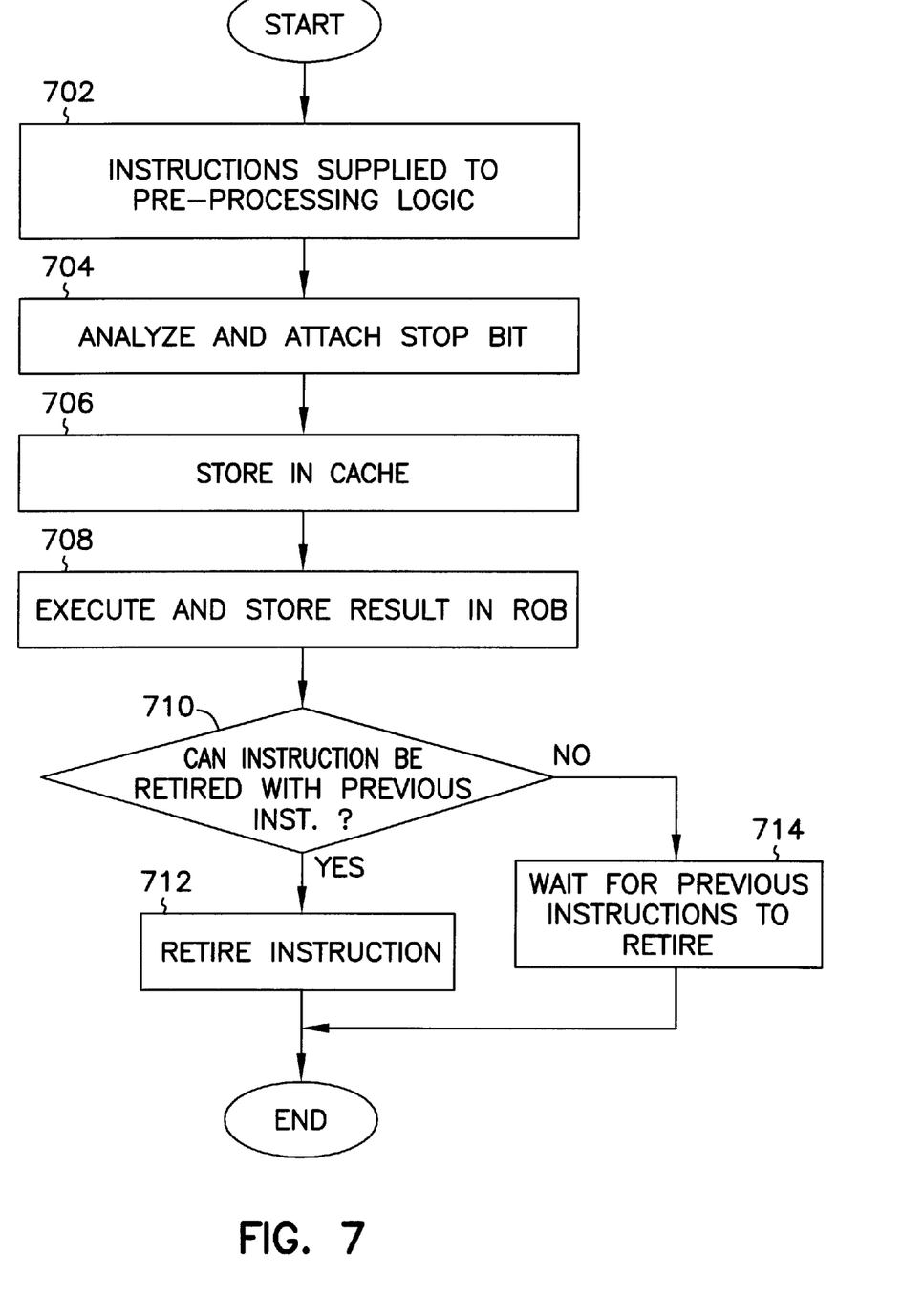

Referring now to FIG. 7, the operation of embodiment 600 is described in more detail. Instructions 101 are retrieved from system memory 102 or otherwise obtained (702). These instructions are analyzed and a stop indication, for example a stop bit, is added to each instruction (704). This bit is set in instructions that, as determined by analysis by the logic 101, cannot be retired in any order together with the instruction before. As such, their retirement, and retirement of instructions following them, is deferred to a subsequent retirement cycle. The instructions are in turn stored in the cache (706) 602 along with the stop bits, and these bits determine at least in part the retirement of instructions by simplified retirement logic 610. Once executed (708) retirement logic 610 reads the stop bit for each instruction in the ROB 606, and retires the instruction (712) if its stop bit is set to so indicate that the instruction can be retired with the instructions before it without concern as the order of retirement (710). If the stop bit indicates that the previous instructions be retired first, then retirement of this instruction is held until such time as the previous instructions have been retired (714).

Figure 8:
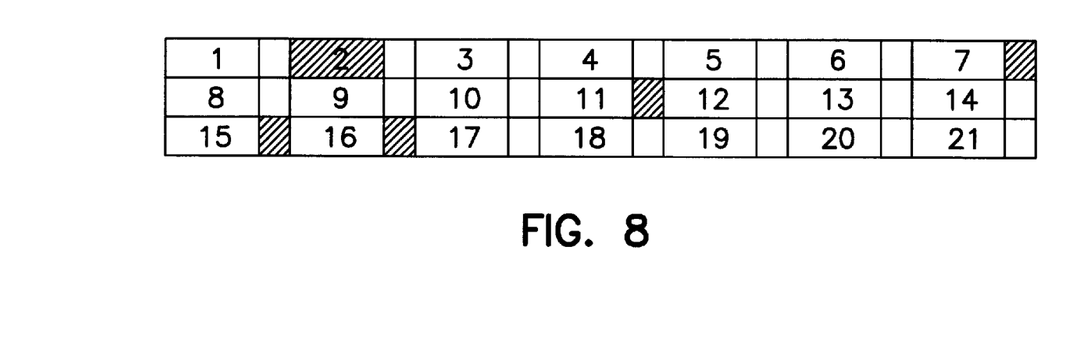

Referring to FIG. 8, there is illustrated a cache line 800 showing stop retirement bits following each instruction (1–21). As illustrated, the stop bit 802 for instruction 1 prevents instruction 2 from retiring with instruction 1, but instruction 2 can retire with instructions 3–7. Similarly, stop bits are added after instructions 7, 11, 15 and 16, as a break to be employed. Thus, the retirement logic 610 can be simplified, as one of its core function is reduced to checking for retirement stop bits. Retirement logic 610 may, however, continue to employ logic to manage resources for outputting results, such as output ports.

Figure 9:
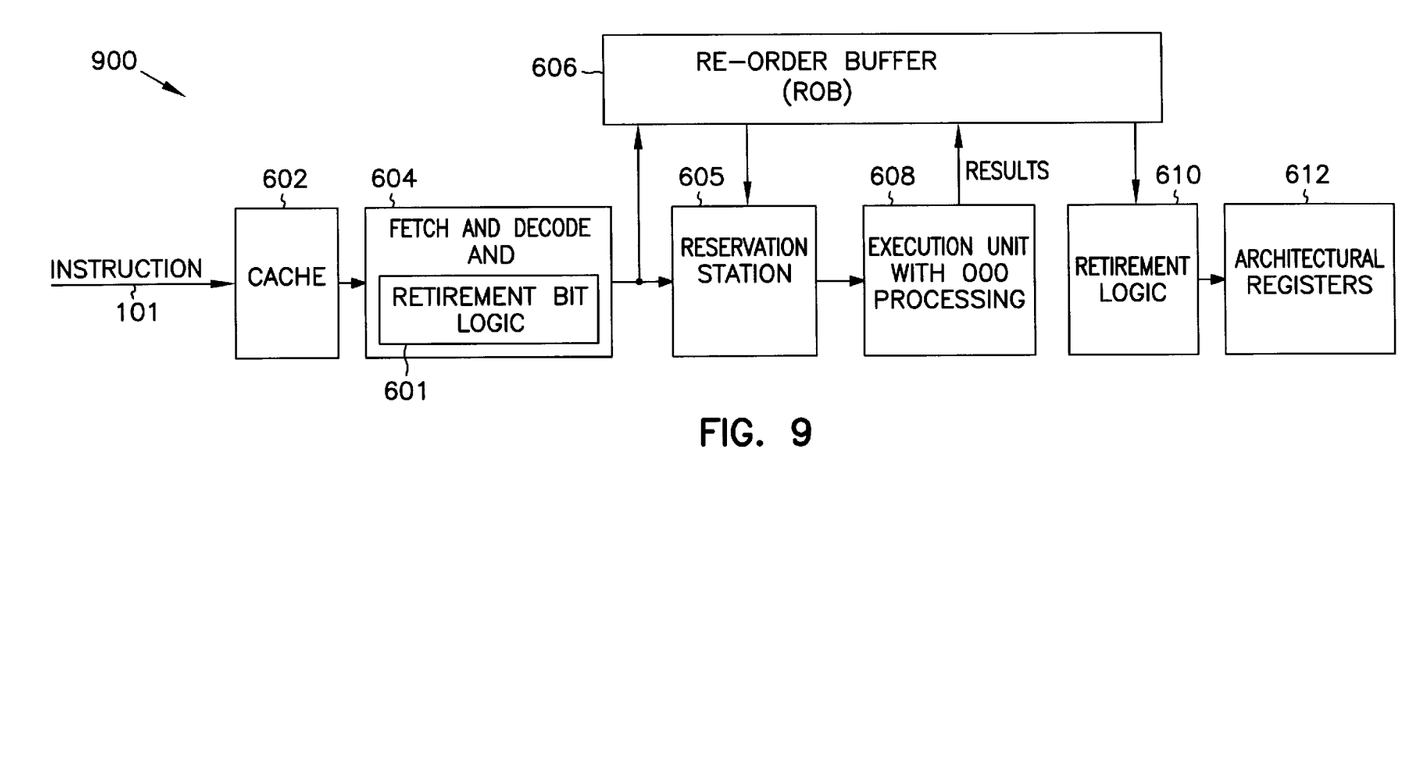
FIG. 9 illustrates yet another example embodiment of the invention.

Referring now to FIG. 9, there is illustrated yet another embodiment 900 of the invention. Embodiment 900 operates similar to embodiment 600, except that the stop retirement bits are determined in the decode or other early pipeline stage of the processor. As illustrated in FIG. 9, logic 601 is illustrated as a component of the fetch and decode stage 604. By moving the computation of stop retirement bits to this stage, additional information may be available regarding when an instruction is available for retirement, as compared to determining the stop bit prior to the decode stage, and thus potentially allows the stop retirement bits to be more efficiently placed in the instruction stream.

It is further noted that part of the motivation for determining the retirement stop bits at the front end of the pipeline, for example either before or after the instruction cache 602, as for example illustrated in FIG. 6, is that this information is derived from the data dependency analysis between the instructions, and is needed by the pipeline front end anyway, to perform register renaming and scheduling. Thus, saving this information in the form of stop bits until the retirement stage obviates the need to recalculate the data dependencies again at that later stage. It is also noted that performing the dependency checks and stop bit generation after the cache 602, as for example shown in FIG. 9, saves the storage in the cache 602 required for the stop bits (bit per instruction). On the other hand, determining the stop bits before the cache can be done at a lower bandwidth (only on cache misses), on a smaller number of instructions per cycle. This can save hardware resources required for computation on a larger number of instructions in parallel, if done after the cache 602, which would consume potentially more substrate area than the additional cache storage required for the stop bits.

Thus, there has been described above method and apparatus for reducing or eliminating retirement logic in a processor with an OOO processing architecture. Although the invention has been described with respect to specific embodiments, it shall be understood that these embodiments are examples only, and that it is contemplated that the described methods and apparatus of the invention can be varied widely while still maintaining the advantages of the invention. Thus, the disclosure should not be taken as limiting in any way the scope of the invention. In addition, as used in the appended claims, the term "unit" shall refer to a digital device that may take the form of a hardwired circuit, software executing on a processor, or a combination of both. Furthermore, the term "storage medium" shall be construed to include, but not be limited to, disk drives, CD-ROMS, RAM or ROM memories, or electronic signals propagating between components in a system or network.

What is claimed is:

1. An apparatus to process instructions comprising an out-of-order processor having a set of architectural registers readable and writable by the instructions, the out-of-order processor to predict a direction of an execution path among certain of the instructions, to determine a set of the certain instructions in the predicted path that do not employ the output of any other instructions in the same path, to form a block of instructions from at least some of the instructions in the set, to copy the architectural registers specified in the block of instructions to respective separate registers, to replace the register specifications in the block of instructions to specify the separate registers rather than the architectural registers themselves, to determined, after replacing all the register specifications, an improved execution order among all the instructions in the block so as to increase performance of the processor, to execute the instructions in the improved order, to determine that the predicted execution path direction is valid, and to write, after determining that the direction is valid, at least some of the separate registers to respective ones of the architectural registers.

2. The apparatus of claim 1 wherein the out-of-order processor copies all of the architectural registers specified in the block of instructions to the respective separate registers, the respective separate registers not being in the architectural set of registers, and wherein the out-of-order processor renames one of the architectural registers to a temporary register, if overwritten.

3. The apparatus of claim 1 wherein the out-of-order processor renames all architectural register read from to a set of registers forming an input copy.

4. The apparatus of claim 3 wherein the out-of-order processor renames all architectural register written to a set of registers forming an output copy.

5. The apparatus of claim 4 wherein the out-of-order processor writes the output copy to architectural registers after determining validity.

6. The apparatus of claim 5 wherein the out-of-order processor places the instructions in the block together in a very long instruction word (VLIW), in the improved order.

7. An apparatus to process instructions comprising:

an out-of-order processor having a set of architectural registers readable and writable by the instructions, the out-of-order processor to predict a direction of an execution path among certain of the instructions, to determine a set of the certain instructions in the predicted path that do not employ the output of any other instructions in the same path, to form a block of instructions from at least some of the instructions in the set, and for each instruction in the block that reads any of the architectural registers produced outside the block, the out-of-order processor to designate a separate register as an input copy of the architectural register read by the instruction, and to rename a register specification in the instruction to read from the input copy rather than from the architectural register itself, and for each instruction in the block that writes any of the architectural registers, the out-of-order processor to designate a separate register as an output copy of any architectural register written by the instruction, and to rename a register specification in the instruction to write the output copy rather than the architectural register itself, and for each instruction in the block that writes any of the architectural registers that would be overwritten by another instruction in the block, the out-of-order processor to designate a separate register as a temporary register, and to rename a register specification in the instruction to write the temporary register rather than the architectural register, and after renaming all the register specifications, the out-of-order processor to execute the instructions in the block out of order so as to increase performance of the processor, to determine that the predicted execution path direction is valid, and after determining that the direction is valid, to write all of the registers in the output copy to their respective architectural registers.

8. The apparatus of claim 7 wherein the out-of-order processor adds a retirement stop bit to the block of instructions.

9. The apparatus of claim 8 wherein the block is a very long instruction word (VLIW).

* * * * *